United States Patent
Schierz et al.

(10) Patent No.: US 11,305,429 B2
(45) Date of Patent: Apr. 19, 2022

(54) SYNCHRONIZATION OF MULTIPLE ROBOTS

(71) Applicants: Atensor Engineering And Technology Systems GmbH, Steyr-Gleink (AT); Convergent Information Technologies GmbH, Haid (AT)

(72) Inventors: Bernhard Schierz, Linz (AT); Wolfgang Stöcher, Ulrich (AT); Gerald Umgeher, Pucking (AT)

(73) Assignees: Atensor Engineering And Technology Systems GmbH, Steyr-Gleink (AT); Convergent Information Technologies GmbH, Haid (AT)

( * ) Notice: Subject to any disclaimer, the term of this patent is extended or adjusted under 35 U.S.C. 154(b) by 592 days.

(21) Appl. No.: 15/767,949
(22) PCT Filed: Sep. 28, 2016
(86) PCT No.: PCT/EP2016/073119
§ 371 (c)(1),
(2) Date: Apr. 12, 2018
(87) PCT Pub. No.: WO2017/063887
PCT Pub. Date: Apr. 20, 2017

(65) Prior Publication Data
US 2018/0311821 A1    Nov. 1, 2018

(30) Foreign Application Priority Data

Oct. 13, 2015   (DE) ..................... 10 2015 116 522.8
Oct. 13, 2015   (DE) ..................... 10 2015 117 419.7

(51) Int. Cl.
*B25J 9/16*     (2006.01)
*B25J 9/00*     (2006.01)
(52) U.S. Cl.
CPC .......... *B25J 9/1669* (2013.01); *B25J 9/0084* (2013.01); *B25J 9/1676* (2013.01); *B25J 9/1682* (2013.01);
(Continued)

(58) Field of Classification Search
CPC ...... B25J 9/1669; B25J 9/1682; B25J 9/1676; B25J 9/0084; G05B 2219/39097;
(Continued)

(56) References Cited

U.S. PATENT DOCUMENTS 6,365,221 B1 *   4/2002   Morton ................. B05B 13/005
                                              427/140
10,131,053 B1 *  11/2018  Sampedro ............. B25J 9/1666
(Continued)

OTHER PUBLICATIONS

Patent Cooperation Treaty, "International Search Report," and English translation of international search, issued in International Patent Application No. PCT/EP2016/073119, dated Sep. 28, 2016, document of 7 pages.
(Continued)

*Primary Examiner* — Masud Ahmed
(74) *Attorney, Agent, or Firm* — Akerman LLP; Peter A. Chiabotti

(57) ABSTRACT

In the following, a method for synchronizing the motion sequences of at least two robots will be described. In accordance with one embodiment, the method comprises the following: During operation of a robot cell having at least two robots, a path parameter is regularly calculated for each of the at least two robots based on a current position of the respective robot and on a previously specified robot path of the respective robot. The path parameter represents the current position of the robot. Subsequently, a run-ahead limit is calculated for each robot based on the path parameters determined for the respective other robots. Based on the respective calculated run-ahead limit, the path speed of every robot can be adjusted.

14 Claims, 3 Drawing Sheets

(52) U.S. Cl.
CPC .............. *G05B 2219/39082* (2013.01); *G05B 2219/39083* (2013.01); *G05B 2219/39097* (2013.01); *G05B 2219/39135* (2013.01)

(58) Field of Classification Search
CPC ........... G05B 2219/39082; G05B 2219/39083; G05B 2219/39135
See application file for complete search history.

(56) References Cited

U.S. PATENT DOCUMENTS

| | | | | |
|---|---|---|---|---|
| 2004/0068348 | A1* | 4/2004 | Jager | G05D 1/0295 700/255 |
| 2011/0066282 | A1* | 3/2011 | Bosscher | B25J 9/1676 700/248 |
| 2012/0215351 | A1* | 8/2012 | McGee | B25J 9/1666 700/248 |
| 2015/0336269 | A1* | 11/2015 | Linnell | B25J 9/1656 700/245 |

OTHER PUBLICATIONS

Bosscher et al., "Real-time collision avoidance algorithm for robotic manipulators", Technologies for Practical Robot Applications, IEEE International Conference on, Piscataway, NJ, USA, ISBN 978-1-4244-4991-0, Nov. 11, 2009, pp. 113-122.

* cited by examiner

SYNCHRONIZATION OF MULTIPLE ROBOTS

CROSS REFERENCE TO RELATED APPLICATIONS

This application is a § 371 National Phase of PCT/EP2016/073119, filed Sep. 28, 2016, the entirety of which is incorporated by reference and which claims priority to German Patent Application No. 10 2015 116 522.8, filed Oct. 13, 2015 and German Patent Application No. 10 2015 117 419.7, filed Oct. 13, 2015.

TECHNICAL FIELD

The present description relates, in general, to the field of industrial robots, and in particular to the controlling of numerous cooperating industrial robots.

BACKGROUND

In robot supported manufacturing, e.g. in the automobile industry, numerous industrial robots often work together simultaneously in a robot cell. For example, numerous robots machine a work piece simultaneously, attach other elements to it or carry out measurement or testing tasks on the work piece. While doing so, the operating areas of the individual robots may overlap, and for this reason the robots cannot be controlled independently of each other. Furthermore, there may be subordinate tasks to be carried out by the robots that depend on each other. This means that a robot may possibly have to wait to continue its operation until another robot has completed a certain subordinate task. Consequently, the robot controller cannot control the movements of the individual robots independently of each other, but instead the motion sequences of the individual robots must be coordinated.

Today, the motion sequences of robots can be either acquired online ("Teach-In" method or "Playback" method) or planned offline in detail and in advance with the aid of software tools for path planning. In both cases, robot programs are created that precisely control the movements of a robot (path and speed). In addition to this, there are software tools for simulating the programmed motion sequences (robot simulator). These robot simulators are capable of simulating the planned motion sequences of numerous robots in a "virtual robot cell". With the aid of the simulation it can be tested whether the planned motion sequence can be carried out without collisions.

The mentioned simulation is generally carried out based on a premise of ideal conditions. When the motion sequences are actually executed, however, unplanned (or unforeseeable) deviations from these ideal conditions may occur. For example, the dwell times of the individual robots spent at certain positions, (e.g. when carrying out a measurement on the work piece), may deviate from the dwell times that were planned in advance. Such deviations may be the result of a variety of causes. For example, the robot simulation may deviate from real operations due to inaccurate model assumptions (e.g. inaccurate acceleration limits for the robot axes). The actual duration of measurements may vary when they are carried out (e.g. due to varying (in dependency of the color of the work piece) exposure times during optical inspections). A manual intervention on the part of service personnel may halt or delay a particular robot's movement. Furthermore, the inexact positioning of the work piece may make adaptations of the motion paths necessary, which also affects the timing of the motion sequences. In the broadest sense, the operations of the robots in a cell are not solely time-controlled, but are also partially controlled by events, (e.g. the completion of a surface machining including the subsequent inspection of the results), that cannot be precisely planned in advance.

Due to the above-mentioned deviations from simulations, in practice a safety mechanism is always needed in order to prevent two robots from colliding. One costly (with regard to the required computing capacity) option consists in extrapolating, during the operation of the robot (online), the actual movements of the robots using a simulator and conducting a collision test based on the 3D model, on which the simulation is based. One object of the present application is to provide a method for controlling numerous robots that allows for the synchronization of the robots' motion sequences within given limits while preventing collisions.

SUMMARY

The mentioned objective is achieved by the method as disclosed herein, as well as by the disclosed system 7. Various embodiments and further developments are also disclosed.

In the following, a method for the synchronization of the motion sequences of at least two robots will be described, the areas of operation of which temporally and spatially overlap. In accordance with embodiment, the method comprises the following: During the operation of a robot cell having at least two robots, a path parameter is regularly calculated for each of the at least two robots based on a current position of the respective robot and on a previously defined path of the respective robot. The path parameter thereby represents the current position of the respective robot. Subsequently, a run-ahead limit is calculated for every robot based on the path parameters determined for the respective other robots. Based on the respective calculated run-ahead limits, the path speed of each robot can be adjusted.

Further, a system having at least two robots will be described, each of which is controlled by a robot controller. In accordance with one embodiment, the robot controllers are configured to regularly determine, during the operation of the robots, a path parameter for the respective robot that is representative of the current position of the respective robot. This determination of the path parameter is carried out based on a current position of each robot and a previously defined path of each robot. The robot controllers are further configured to calculate, based on the path parameter(s) determined for (each of) the other robot(s), a run-ahead limit for the respective robot. Based on the run-ahead limit calculated for each respective robot, a path speed of the robot can be adjusted.

BRIEF DESCRIPTION OF THE FIGURES

In the following, the application will be described in greater detail by means of the examples shown in the figures. The representations are not necessarily true to scale and the application is not limited to the aspects shown. Instead, emphasis is placed on illustrating the underlying principles of the application. The figures show.

DETAILED DESCRIPTION

Figure 1:
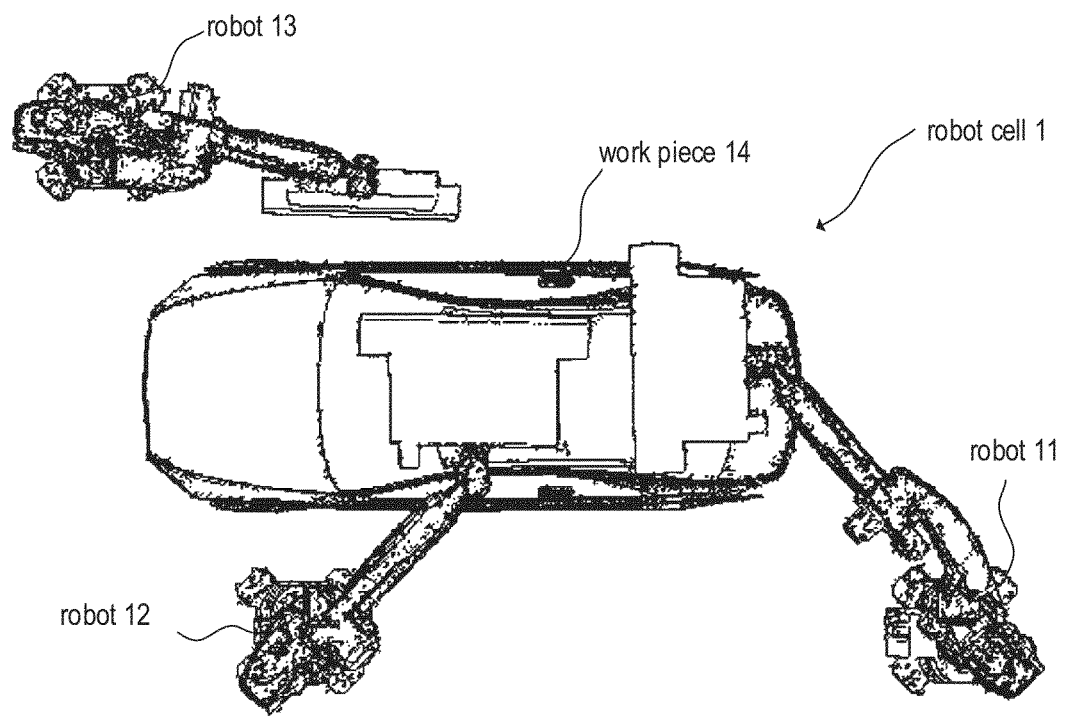
FIG. 1 shows a robot cell with numerous robots.

FIG. 1 shows an example of a robot cell with numerous cooperating robots, whereby "cooperating" is understood here to mean that the robots arranged in the robot cell carry out their operations such that their areas of operation overlap both temporally and spatially and that they adjust their path speeds during operation in order to prevent collisions. In the present example, three industrial robots 11, 12 and 13 are in operation in a robot cell 1, carrying out different tasks on the work piece 14 (here the body of an automobile). These tasks may include a mechanical machining (e.g. sanding, polishing, varnishing), the handling of parts and fitting them into or attaching them onto the work piece, the performing of measurements, etc. Industrial robots are widely employed in the mass production of automobiles. The present application, however, is not limited to the manufacture of vehicles but may instead be employed in any other area in which numerous robots cooperate in one way or another to accomplish one or more tasks.

As mentioned further above, a work operation (process) that is to be carried out by robots is preceded by the programming of the motion sequences (defining, online or offline, the robot path and the path speed) of the individual robots and of each operational step. These programmed paths can be subsequently validated with the aid of a robot simulator (virtual robot cell). Thereby, it is particularly tested whether and under what circumstances collisions or other problems might arise. After the motion sequences are successfully tested (validation), they can be automatically converted into robot programs that are then implemented by the controllers of the individual robots.

A robot path can be represented mathematically as mapping (function $B_i$) a time interval $[0, T]$, during which a robot $R_i$ traverses the path, to a configuration position $B_i(t)$ in a configuration space $\mathbb{R}^{n_i}$ i.e., $$B_i : [0, T] \to \mathbb{R}^{n_i}, t \mapsto \begin{pmatrix} a_1(t) \\ \vdots \\ a_{n_i}(t) \end{pmatrix} \text{ for } i = 1, \ldots, k, \quad (1)$$

wherein k designates the number of robots in considered the robot cell and $n_i$ is the number of degrees of freedom of the i-th robot $R_i$. The vector representing the configuration position $B_i(t)$ usually contains the joint angles $a_1, \ldots, a_{n_i}$ and thereby unambiguously defines the position of the robot $R_i$. In the example of FIG. 1, the values, in the case of standard industrial robots with six degrees of freedom, would be k=3 and $n_1=n_2=n_3=6$. The time t in the interval $[0, T]$ is a path parameter that unambiguously identifies a given configuration position $B_i(t)$ in the configuration space $\mathbb{R}^{n_i}$ (axle configuration of the robot $R_i$). In the simulation of a robot path $B_i$, this path parameter is also called "simulation time". Although the term "simulation time" contains an association with the physical value "time", it nevertheless offers no information about when, during the execution of a robot program, a specific configuration position $B_i$ is actually reached. Consequently, the simulation time should be understood as an abstract path parameter representing a configuration position $B_i$, and not as time in the classical sense.

In order to prevent a collision, the volumes occupied by the robots $R_i$ (i=1, ..., k) in three-dimensional space $\mathbb{R}^3$ is considered during a collision test. The volume occupied by the robot $R_i$ in a configuration position (axle configuration) (or the enveloping surface of the robot), can be regarded as a mapping (function $P_i$) of the configuration position $B_i(t)$ in the configuration space $\mathbb{R}^{n_i}$ to the three dimensional space $\mathbb{R}^3$, i.e.

$$P_i : \mathbb{R}^{n_i} \to \wp(\mathbb{R}^3), \begin{pmatrix} a_1 \\ \vdots \\ a_{n_i} \end{pmatrix} \mapsto S_i, \text{ for } i = 1, \ldots, k, \quad (2)$$

wherein $S_i$ is a subset of the three dimensional space $\mathbb{R}^3$ ($S_i \subset \mathbb{R}^3$) and designates the volume occupied by the robot $R_i$ in a given axle configuration $(a_1, \ldots, a_{n_i})$ ($\wp(\mathbb{R}^3)$ designates the power set of $\mathbb{R}^3$). Two configuration positions $B_i(t)$ and $B_j(t)$ are collision free when the intersection of the corresponding volumes $P_i(B_i(t))$ and $P_j(B_j(t))$ is empty, i.e.

$$P_i(B_i(t)) \cap P_j(B_j(t)) = \{ \}, \text{ for } i \neq j. \quad (3)$$

A so-called 3D collision test can then be carried out by evaluating the condition in accordance with Equation 3 for two configuration positions $B_i(t)$ and $B_j(t)$ of two robots $R_i$ and $R_j$. If the intersection is not empty, the robots will collide.

As mentioned above, a collision test conducted "offline" with the aid of a robot simulation alone is insufficient, because "online", i.e. while the robots are carrying out their motion sequences, the time behavior is dependent on influences that could not be foreseen in the simulation. It is therefore desirable, or even necessary, to also conduct a collision test during operation of the robots, i.e. to calculate collisions in advance in order that counter measures (e.g. braking, emergency stop, etc.) may be taken in advance. During the simulation/validation of the planned robot path a 3D collision test is conducted "offline", which is relatively costly (with regard to computing capacity). Conducting continuous 3D collision testing throughout the run-time of the robot would require large quantities of 3D data for representing the involved objects as well as massive computing capacities. There is therefore a need for alternative approaches.

With the aid of the method described here, it is possible to carry out a collision test "online" in an easy manner. When doing so, for each pair of robots $R_i$, $R_j$ at every point in time t, only a single parameter is required, which is designated as maximum run-ahead time and which can be determined with the aid of a simulation of the robot paths in a virtual robot cell. Assuming that the robot $R_i$, at any given point in time t (wherein $t \in [0, T]$), is at its previously planned target position $B_i(t_0)$ (in the configuration space $\mathbb{R}^{n_i}$), a run-ahead time $\Delta t$ can be defined as the temporal distance between the actual (measurable or known to the robot controller) configuration position $B_j(t_0+\Delta t)$ of the robot $R_j$ and its previously planned and in the simulation validated target position $B_j(t_0)$. The maximum run-ahead time $v_{ij}(t)$ is thus the utmost run-ahead time $\Delta t$ by which the robot $R_j$ may run ahead of the robot $R_i$ without a collision occurring. Mathematically, the maximum run-ahead time $v_{ij}(t)$ can be defined by means of the function $$v_{ij}:[0,T] \to [0,T], t \mapsto \max\{\Delta t | P_i(B_i(t)) \cap P_j(B_j(t+\Delta t)) = \{ \}\}. \quad (4)$$

The maximum run-ahead time $v_{ij}(t)$ can be determined "offline" (by means of simulation in a virtual robot cell) and saved for every pair of robots $R_i$, $R_j$ and every (simulated) point in time. All that is now needed by the robot controllers during the run time of the robots are the maximum run-ahead times $v_{ij}(t)$ that were determined in advance by means of the simulator in a sufficiently precise temporal resolution in order that the maximum possible movement between the calculated points in time be incapable of causing an infringement of the specified safety distances. A costly 3D collision test can thus be avoided. For points in time within an interval between two consecutive calculated time points, the minimum of the two calculated maximum run-ahead times can be assumed.

Figure 2:
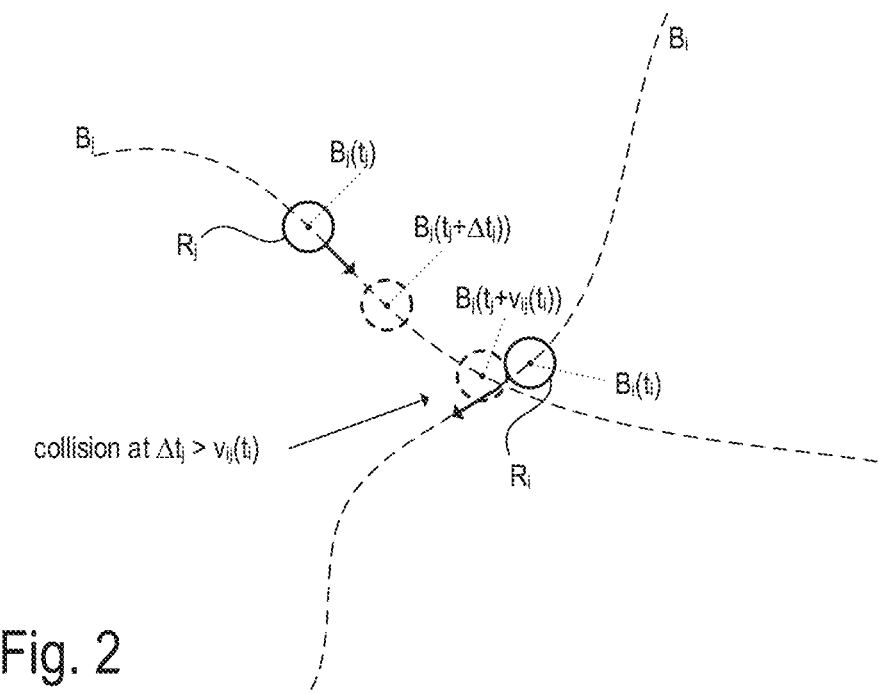
FIG. 2 illustrates, by means of a schematic drawing, the concept of the run-ahead time of a robot in relation to another robot.

FIG. 2 is a schematic drawing for illustrating the above rather mathematically described concept of run-ahead time. The dashed lines represent the robot paths $B_i$ and $B_j$ of the robots $R_i$ and $R_j$. At a point in time $t_i$, the robot $R_i$ is at its planned (target) position $B_i(t_i)$ in an area (collision area) in which the paths of the two robots intersect (or at least come close enough that a collision is possible). In accordance with the simulated robot path, the robot $R_j$ should be at the position $B_j(t_j)$ at the time $t_j$. In the event that the robot $R_j$ (for any given reason) should run ahead of the robot $R_i$, the greater the run-ahead time $\Delta t_j$, the closer it will come to the robot $R_i$. The maximum run-ahead time $v_{ij}(t_i)$ is the run-ahead time by which the robot $R_j$—at the point in time $t_i$—can run ahead in relation to the robot $R_i$ while just still avoiding collision. The maximum run-ahead times can be calculated in advance with the aid of a robot simulator. During the simulation it is tested how far a robot $R_j$, at a simulated point in time $t_j$, can be—temporally—moved along its defined path without a collision taking place. The collision test is carried out "offline", e.g. with the aid of a 3D collision test. The calculation of the maximum run-ahead time is carried out for various points of time within a given time frame and for every pair of robots $R_i$, $R_j$($i \neq j$).

The maximum run-ahead times $v_{ij}(t)$ determined by means of the simulation are variable and depend on the path parameter t (simulation time). It can therefore happen that the maximum run-ahead time for a specific robot $R_j$, at a point in time to (for a path parameter to) is very large (e.g. infinite), while, at a later point in time $t_i$ (for a path parameter $t_i$), it can be relatively small (e.g. nearly zero). Thus, although a relatively long run-ahead $\Delta t$ may be, at the point in time $t_0$, unproblematic, the same run-ahead time $\Delta t$ may be too large at the point in time $t_i$ and may result in a collision. Hence, the robot controller must "anticipatorily" take into account the maximum run-ahead times $v_{ij}(t)$. In the present example, therefore, the run-ahead time $\Delta t$ at the point in time to may not be of just any desired duration (the condition $\Delta t < v_{ij}(t_0)$ is necessary, but not sufficient), but instead must be kept short enough to ensure that staying within the maximum run-ahead time $v_{ij}(t_1)$ at a later point in time $t_1$ is still possible. This "anticipatory" consideration of the maximum run-ahead times $v_{ij}(t)$ can, for example, be achieved by transforming the maximum run-ahead times $v_{ij}(t)$ into "anticipatory maximum run-ahead times" $w_{ij}(t)$. This transformation can be carried out in various ways (e.g. while taking into account the maximum possible braking accelerations). One simple and safe option (with regard to a worst case scenario) consists in using, at every point in time t (in the simulation time), the shortest maximum run-ahead time from among the maximum run-ahead times $v_{ij}(t)$ in each time interval $[t, T]$ (i.e. from the current point in time to the end of the planned motion sequence). In this case the anticipatory maximum run-ahead time $w_{ij}(t)$ can be calculated using the following equation:

$$w_{ij}:[0,T] \to [0,T], t \mapsto \min\{v_{ij}(t+u) | u \in [0,T-t]\}. \tag{5}$$

This means that, if, for a pair of robots $R_i$, $R_j$ at time point t=0, the maximum run-ahead time $v_{ij}(0)$ of the robot $R_j$ is infinitely long and the maximum run-ahead time $v_{ij}(1)$ for a point in time t=1 s is only 0.3 s, then the anticipatory maximum run-ahead time $w_{ji}(0)$ at the point in time $t_0$ is not, in fact, infinite, but rather maximum 1.3 s. Thus, the anticipatory maximum run-ahead time $w_{ij}(t_0)$ at a point in time $t_0$ also takes into account the maximum run-ahead times $v_{ij}(t_0)$ for later points in time $t > t_0$ (and $t < T$).

In order to synchronize numerous robots of a robot cell while taking into account the calculated anticipatory maximum run-ahead times $w_{ji}(t)$ and thus prevent collisions, all anticipatory run-ahead times $w_{ji}(t)$ (for all $i \neq j$) for the robot $R_j$ must be available to the robot controller. During run time, the robot controllers of the individual robots $R_i$ (i=1, ..., k) indirectly exchange information about their "progress" while moving along their robot paths, i.e. about their current positions (in the configuration space) by exchanging the path parameters that designate their respective positions on the previously determined robot path. For each robot $R_j$, the corresponding robot controller can calculate its own current run-ahead time limit $t_{v,j}(t)$ based on the anticipatory maximum run-ahead times $w_{ji}(t)$ calculated in advance by means of simulation and on the current simulation times $t_i(t)$ (path parameters) of the other robots $R_i$ ($i \neq j$). The current run-ahead time limit $t_{v,j}(t)$ for the robot $R_j$ is the minimum of the anticipatory maximum run-ahead times $w_{ji}(t)$ with regard to the other robots $R_i$ (for all $i \neq j$), meaning:

$$t_{v,j}:[0,T] \to [0,T], t \mapsto \min\{w_{ij}(ti(t)) | \text{für alle } i \neq j\}. \tag{6}$$

For every robot $R_j$ (j=1, ..., k), the path speed can be adapted in dependence of the current run-ahead time limit $t_{v,j}(t)$. For this purpose, the robot controller of the respective robot $R_j$ can determine—at every point in time t—a current braking time $t_{B,j}$. As a rule, this braking time $t_{B,j}$ is dependent on the current path speeds and the maximum braking delays of the robot axes of the robot $R_j$. As long as the braking time $t_{B,j}$ for the respective robot $R_j$ is shorter than the current run-ahead time limit $t_{v,j}(t)$, i.e. as long as the inequality $$t_{B,j}(t) < t_{v,j}(t) \tag{7}$$

is fulfilled, the path speed of the robot $R_j$ may be increased (up to a definable maximum value). In this case the robot tries to run ahead as far as possible, causing the other robots to "catch up". As soon as the current braking time $t_{B,j}$ becomes longer than the run-ahead time limit $t_{v,j}(t)$, the path speed of the robot must be reduced until Inequality 7 is once again fulfilled.

Figure 3:
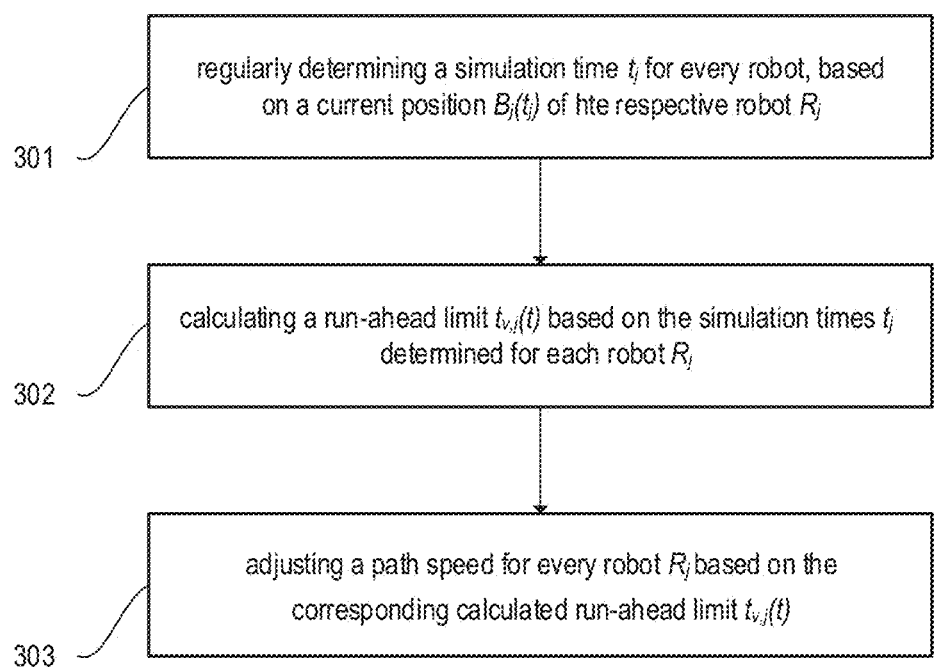
FIG. 3 illustrates, by means of a flow chart, one example of the method in accordance with the application.

In the following, the method described above will now be summarized with reference to the flow chart. During operation of a robot cell having at least two robots, a path parameter $t_j$ is regularly (periodically or from time to time) determined for each robot $R_j$ based on its current position $B_j$ (FIG. 3, step 301). As explained above, the path parameter corresponds to the above-mentioned simulation time $t_j$ of a given robot, i.e. to the hypothetical point in time $t_x$ at which the position $B_j(t_x)$ on the specified robot path is the same or as close as possible to the current position $q_j$ of the robot $R_j$. The robot controllers of the individual robots exchange the determined path parameters/simulation times $t_j$, enabling every robot controller to know the current path parameters/simulation times of all robots. Based on the determined path parameters/simulation times $t_j$ of the respective other robots $R_i$, a run-ahead limit $t_{v,j}(t)$ can then be calculated for each robot $R_j$ (FIG. 3, step 302). In accordance with Equation 6, the run-ahead limit $t_{v,j}(t)$ for a robot $R_j$ is the minimum of the anticipatory maximum run-ahead times $w_{ji}(t_i)$ in relation to the other robots $R_i (i \neq j)$. Finally, the path speed of every robot $R_j$ is adapted based on the calculated run-ahead limit $t_{v,j}(t)$ (FIG. 3, step 303). For example, the path speed can be reduced (if necessary, down to zero) if a (in dependence of the current path speed) estimated braking time is not shorter than the run-ahead limit $t_{v,j}(t)$ for the respective robot.

In order to calculate the run-ahead limits $t_{v,j}(t)$ of the individual robots $R_j$, first of all the maximum run-ahead times $v_{ji}(t)$ and the anticipatory maximum run-ahead times $w_{ji}(t)$ are determined, as described above. Accordingly, for every ordered pair of robots $R_j$, $R_i$ a maximum run-ahead time $v_{ji}(t)$ is calculated—by means of simulation of the (parameterized) robot paths specified in advance and for a series of path parameter values. This is the time by which the first robot $R_j$ of a pair of robots may run ahead of the second robot $R_i$ of the robot pair without causing a collision (cf. Equation 4). The mentioned series of path parameter values is created by means of discretization of the interval [0, T] in which the respective robot path $B_j(t)$ is defined. The maximum run-ahead time $v_{ji}(t)$ for a given path parameter t (simulation time) alone is not enough as the maximum run-ahead time $v_{ji}(t)$ is not a constant value and may change. For this reason, a so-called anticipatory maximum run-ahead time $w_{ij}(t_0)$ is calculated for every ordered pair of robots $R_j$, $R_i$ and for a given path parameter $t_0$ (the above mentioned series of path parameters) based on the maximum run-ahead time $v_{ij}(t_0)$ for the given path parameter $t_0$ and the following path parameter ($t > t_0$) in the series of path parameters (see Equation 5). The information on the maximum run-ahead times allows every robot to strive on its own to reach the highest speed it can without colliding with the other robots. A regulator for the speed is not needed. Thus, the synchronization of numerous robots is greatly simplified.

In the following an example will be used to describe how the corresponding path parameter (here: simulation time) can be determined in the robot program based on a detected robot position $q_j$ of a robot $R_i$. In order to keep the data volume and the computing effort for the robot controller small, to control the robot $R_i$, the corresponding robot path $B_i(t)$ is divided up into numerous segments $S_{ij}$ (segment $S_{ij}$ is the j-th of $s_i$ segments of the path $B_i(t)$ of the robot $R_i$, j=, . . . , $s_i$):

$$S_{ij}:[T_{ij}, T_{i(j+1)}] \to \mathbb{R}^{ni}, t \mapsto B_i(t), \text{ wherein } T_{i0}=0 \text{ and } T_{i(si+1)}=T. \quad (9)$$

The time $T_{ij}$ is the starting time of the j-th segment of the path $B_i(t)$ of the robot $R_i$. The time $T_{i(j+1)}$ is the ending time of the j-th segment $S_{ij}$ and is likewise the starting time of the (j+1)-th segment $S_{i(j+1)}$. The desired motion sequences are communicated by the robot controller to the robot $R_i$ by means of motion sets. The j-th motion set for the robot $R_i$ is given by $$MOV_{ij} = \{B_i(T_{ij}), B_i(T_{i(j+1)})\} \quad (10)$$

While carrying out the motion sequence defined by a motion set $MOV_{ij}$, the current configuration position $q_i$ (e.g. vector of the joint angle and also the axis configuration) of the robot $R_i$ can be measured in short time intervals. The simulation time $t_i$ can now be determined by means of a simple interpolation between the starting point and the end point of the motion set $MOV_{ij}$ and the measured configuration position $q_i$. For the simulation time $t_i$, it holds true that $B_i(t_i) \approx q_i$.

Figure 4:
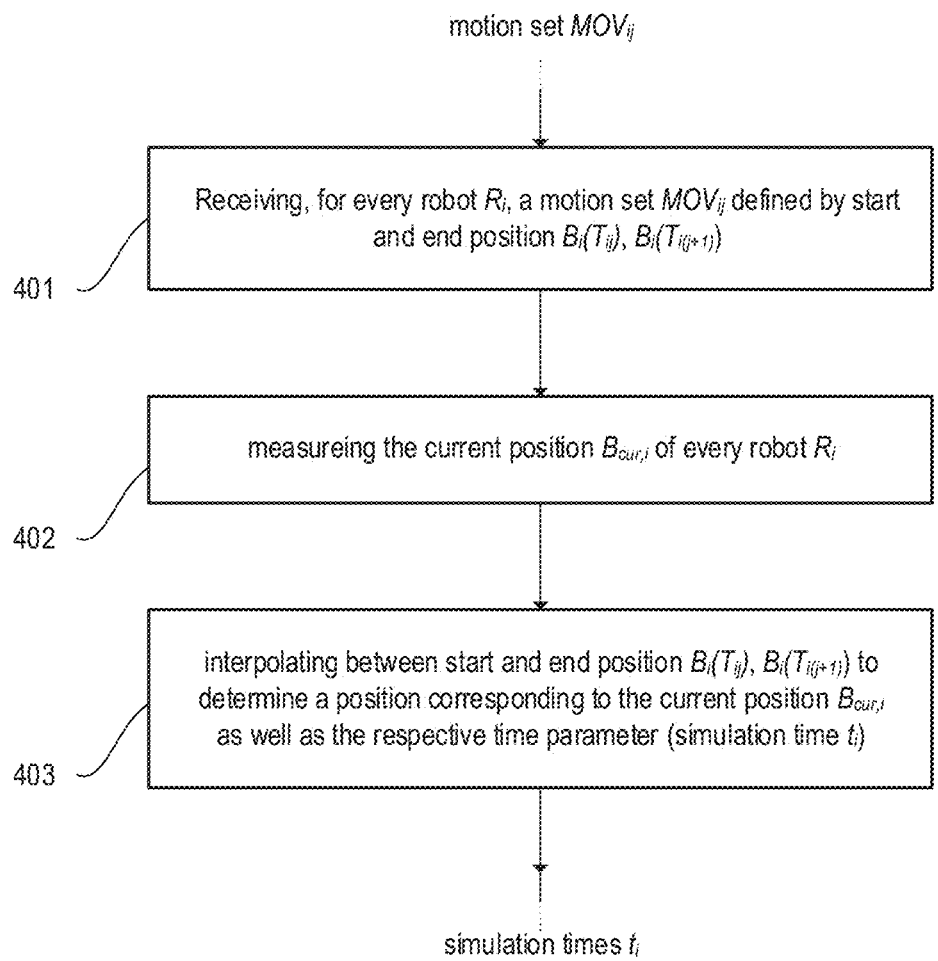
FIG. 4 illustrates, by means of a flow chart, one possible example of the calculation of the path parameter of a robot path that represents the current position.

The procedure described above is summarized in the flow chart in accordance with FIG. 4. In the example shown, the controller of a robot $R_i$ sequentially works through motion sets $MOV_{ij}$, each of which is given by a starting point $B_i(T_{ij})$ and an end point $B_i(T_{i(j+1)})$ including the corresponding time parameters $T_{ij}$ and $T_{i(j+1)}$ (simulation time of the starting and of the end position $B_i(T_{ij})$ and $B_i(T_{i(j+1)})$ of the j-th segment of the motion sequence of the robot $R_i$) (FIG. 4, step 401). Accordingly, the robot moves from the starting position to the end position of each segment of the specified robot path. The end position of a segment j is the starting position of the following segment j+1. The current (configuration) position $q_i$ of the robot $R_i$ is constantly measured (FIG. 4, step 402) and is therefore known to the robot controller. The path parameter of the specified motion sequence $B_i(t)$ that represents the current position $q_i$ (i.e. the sought simulation time $t_i$) can be determined by interpolation between starting point $B_i(T_{ij})$ and an end point $B_i(T_{i(j+1)})$ of the current motion set $MOV_{ij}$, thus is holds true that: $q_i \approx B_i(t_i)$.

The invention claimed is:

1. A method for synchronizing motion sequences of at least two robots whose areas of operation overlap temporally and spatially; the method comprising:
   during the motion of the at least two robots:
      regularly determining a path parameter for every robot of the at least two robots based on a current position of a respective robot and a previously specified robot path of the respective robot, wherein the path parameter represents a current position of the respective robot;
      for every robot:
         calculating a run-ahead limit based on a path parameter determined for each respective other robot;
      for every robot:
         adjusting the path speed of the respective robot based on the corresponding calculated run-ahead limit; and
   wherein the previously specified robot path of the respective robot is not altered.

2. The method in accordance with claim 1, further comprising;
   providing the specified robot paths in parametric representation for each of the at least two robots, wherein, for each robot, the path parameter designates a robot position on the specified robot path.

3. The method in accordance with claim 1, further comprising;
   for every ordered pair of robots of the at least two robots:
      calculating, based on a simulation of the previously specified robot paths and for various path parameter values, a maximum run-ahead time, wherein the maximum run-ahead time is a time by which a first robot of the ordered pair of robots can run-ahead of a second robot of the ordered pair of robots without causing a collision.

4. The method in accordance with claim 3, further comprising;
   for every ordered pair of robots of the at least two robots and a given path parameter:
      calculating an anticipatory maximum run-ahead time based on the maximum run-ahead time for the given path parameter and following path parameters.

5. The method in accordance with claim 4, wherein the run-ahead limit for every robot is determined based on the anticipatory maximum run-ahead times for the determined path parameter of each respective other robot.

6. The method in accordance with claim 1, wherein the determination of the path parameter of a robot is based on an interpolation between two positions that define a segment of the previously specified robot path of the respective robot.

7. A system including at least two robots, each of which is controlled by a robot controller; each robot controller being configured to, while the robots are in operation:
   regularly determine a path parameter for each robot representing a current position of the respective robot based on a current position of the respective robot and a previously specified robot path of the respective robot, wherein the previously specified robot path of the respective robot is not altered;
   calculate a run-ahead limit for each robot based on the path parameters determined for each respective other robot; and adjust a path speed of the robot based on the run-ahead limit calculated for the respective robot.

8. The system in accordance with claim 7, further comprising:
   a robot simulator configured to determine for every ordered pair of robots of the at least two robots and for various path parameter values, based on a simulation of the previously specified robot paths, a maximum run-ahead time, wherein the maximum run-ahead time is the time by which a first robot of the robot pair can run ahead of a second robot of the robot pair without causing a collision.

9. The system in accordance with claim 8, wherein the robot simulator is further configured to calculate, for every ordered pair of robots of the at least two robots and for a given path parameter, an anticipatory maximum run-ahead time based on the maximum run-ahead time for the specific path parameter and following path parameters.

10. The system in accordance to claim 7, wherein the robot controllers are configured to;
   determine, based on a interpolation between two positions and two corresponding path parameter values which define a segment of the previously specified robot path of the respective robot, the path parameter representing the current position of the respective robot.

11. The method of claim 1,
wherein the path parameter is a time parameter identifying a specific position included in the previously specified robot path of the respective robot.

12. The method of claim 1,
wherein the path parameter is a single time parameter.

13. The method of claim 1,
wherein the run-ahead limit is determined based on the maximum run-ahead times, which are calculated for each robot in relation to another robot(s).

14. The method of claim 11,
wherein the maximum run-ahead time of a robot represents the maximum time the robot may run ahead as compared the previously specified robot path in order to avoid a collision with another robot.

* * * * *